3,657,279
Patented Apr. 18, 1972

3,657,279
PROCESS OF MONOESTERIFICATION OF DICARBOXYLIC ACIDS
Hideo Higashi, 15-4, 3-chome Takaban, and Kotaro Morinaga, 11-7, 1-chome Gakuenmachi Kurume-cho, both of Tokyo, Japan
No Drawing. Filed May 14, 1970, Ser. No. 37,327
Claims priority, application Japan, May 21, 1969, 44/39,427
Int. Cl. C07d 7/22; C07c 69/40, 69/60
U.S. Cl. 260—345.5
1 Claim

ABSTRACT OF THE DISCLOSURE

A process for producing monoesters of dicarboxylic acids or the metal salt additives thereof characterized by reacting higher alcohols, cyclic alcohols or substances that contain the mentioned compounds with dicarboxylic acid anhydrides in the presence of a metal trihalide in the amount that is required for the esterification reaction.

---

The present invention relates to a process for producing monoesters or additives thereof to metal salts by the reaction of dicarboxylic acid anhydrides with alcohols.

Monoesters of organic dicarboxylic acids can be readily prepared by usual methods of esterification such as using acid or pyridine catalyst from dicarboxylic acid anhydrides and lower primary alcohols, while the reactions of dicarboxylic acid anhydrides with higher alcohols and cyclic alcohols can hardly proceed by the usual methods of esterification.

In the process of this invention, dicarboxylic acid anhydrides react directly with these alcohols in the presence of metal trihalide, and the esterification reaction can be quantitatively completed at a relatively low temperature and in a short time.

Metal trihalides, for example aluminum chloride, have been so far employed generally as a polymerization catalyst. In this invention, however, aluminum chloride takes part in the essential reaction rather than as catalyst, so that, as the reaction proceeds to form a monoester, aluminum chloride is decomposed to evolve hydrogen chloride and the aluminum is combined with the liberated carboxylic acid group into a salt. Since aluminum chloride is not a mere catalyst but plays an essential role in the esterification reaction, a small amount of aluminum chloride, 1 to 2% for example, is not sufficient for the purpose but an amount equivalent to dicarboxylic acid and alcohol is required. No example is known so far that metal trichloride is used for an esterification reaction.

More particularly in this invention, dicarboxylic acid anhydride such as anhydrides of phthalic acid, succinic acid and maleic acid can be reacted in the presence of an equivalent amount of metal trichloride with alcohol such as, for example, oleyl alcohol, sterols and tocopherols, so that esters of monooleyl phthalate, monocholesterol succinate and monotocopherol maleate and the metal salt additives can be quantitatively prepared in a simple process.

In practising this invention, dicarboxylic acid anhydrides to be used in this reaction as readily reacting ones include anhydrides of phthalic acid, maleic acid and succinic acid, while, among higher alcohols and cyclic alcohols, oleyl alcohol as higher alcohol and tocopherol and cholesterol as those having cyclic structure can be employed favorably in this reaction because of their stability in the acid medium. Owing to the different reaction velocities of component alcohols, a certain alcohol can be reacted or fractionated in a mixture of alcohols by merely adjusting the amount of metal trihalide to be added. As for the temperature of reaction, a temperature between 60 to 100° C. is desired because the reaction does not proceed at the room temperature. Further a nonpolar solvent is desirable for the reaction which is indifferent to the reaction.

Examples of the present invention will be shown below.

EXAMPLE 1

A mixture consisting of 1 part of maleic acid anhydride, 2 parts of dl-α-tocopherol, 1 part of aluminum trichloride and 10 parts of cyclohexane was heated under reflux. Hydrogen chloride gas which evolved vigorously as the reaction progressed was removed from the reaction system. The reaction was completed in 20 minute heating. The excessive maleic acid which was separated when the reaction mixture was cooled and the supernatant liquor was washed with a dilute hydrochloric acid, and then cyclohexane was distilled out when 2.5 parts of mono-dl-α-tocopherol ester of maleic acid was obtained, melting point, 70° C. This substance was identified by the maximum absorption of the ultraviolet absorption spectrum at 285 m$\mu$, the acid value 107 and the saponification value 215.

EXAMPLE 2

A mixture consisting of 1 part of succinic acid anhydride, 2 parts of cholesterol and 1 part of antimony trichloride was heated at about 80° C. together with ligroin added. The heating was interrupted in 30 minutes. The excessive succinic acid was removed from the reaction solution as in Example 1, and the remaining solution was washed with dilute hydrochloric acid and ligroin was distilled out when 2.5 parts of succinic acid monocholesterol ester was obtained. The melting point of the succinic acid monocholesterol ester was 177° C.

EXAMPLE 3

A mixture consisting of 1 part of phthalic acid anhydride, 2 parts of oleyl alcohol and 1 part of aluminum chloride was heated together with added heptane. The heating was continued for 20 minutes when the reaction was interrupted. From the reaction mixture, excessive phthalic acid was removed as in Example 1, and the remaining solution was washed with dilute hydrochloric acid and heptane was distilled out when 2.5 parts of phthalic acid monooleyl alcohol ester was obtained as crystals.

EXAMPLE 4

A mixture consisting of 1 part of maleic acid anhydride, 2 parts of dl-α-tocopherol and 1 part of aluminum chloride was heated for 20 minutes as in Example 1 together with 10 parts of cyclohexane added. The excessive maleic acid was removed when the reaction mixture was cooled. Then cyclohexane was distilled out when 2.5 parts of an aluminum salt of maleic acid mono-dl-α-tocopherol ester was obtained.

What is claimed is:
1. A process for producing monoesters of dicarboxylic acids or the metal salt additives thereof characterized by reacting higher alcohols, cyclic alcohols or substances that contain the mentioned compounds with dicarboxylic acid anhydrides in the presence of a metal trihalide in the amount that is required for the esterification reaction.

References Cited

UNITED STATES PATENTS 3,534,087  10/1970  Leftin et al. _____ 260—485

FOREIGN PATENTS 694,601  9/1964  Canada _____ 260—475

JOHN M. FORD, Primary Examiner

U.S. Cl. X.R.

260—475 N, 485 N, 485 L, 397.2